No. 673,594. Patented May 7, 1901.
W. H. BEVANS.
SEMI-AUTOMATIC BREECH LOADING ORDNANCE.
(Application filed Dec. 28, 1900.)
(No Model.) 5 Sheets—Sheet 1.
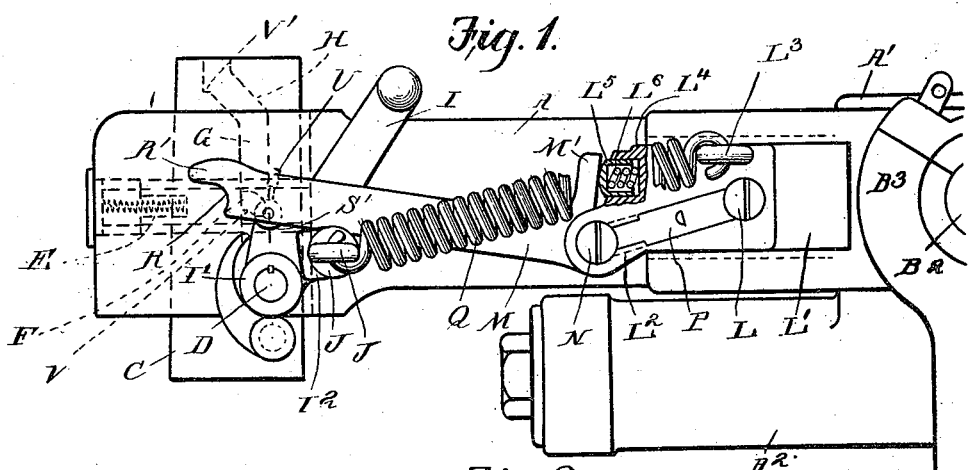
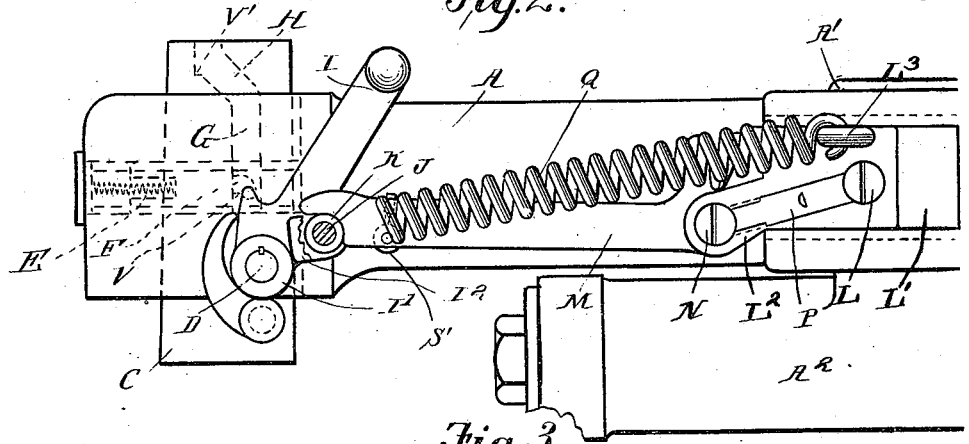
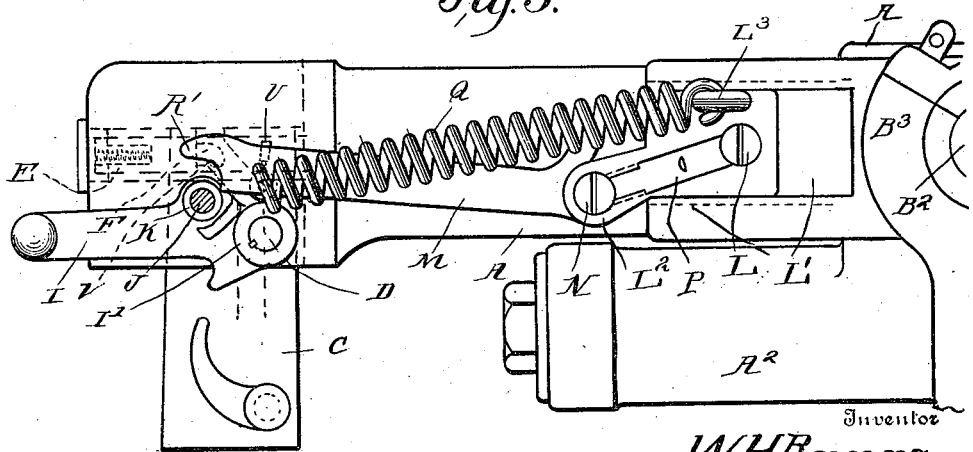
Witnesses
T. P. Britt
L. H. Windsor
Inventor
W. H. Bevans,
by James W. Bevans
his Attorney

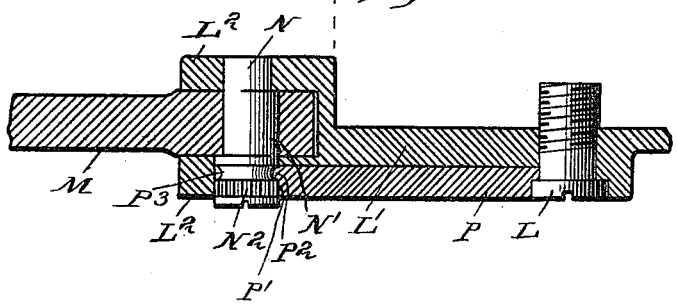
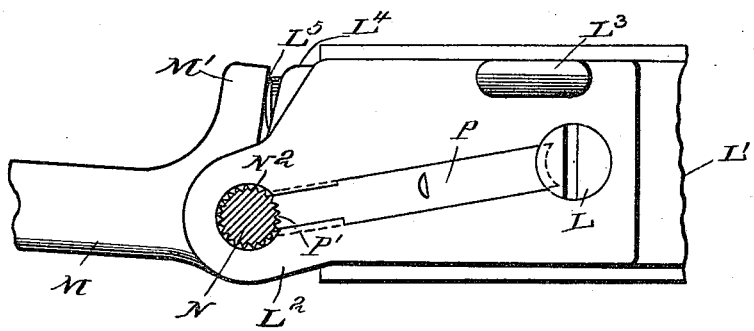
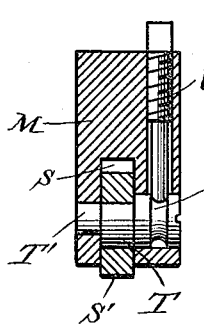
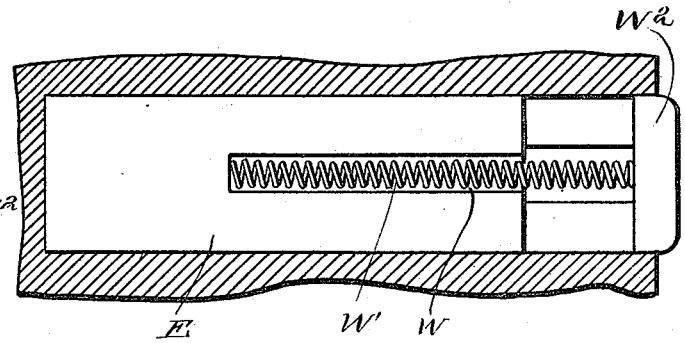

No. 673,594. Patented May 7, 1901.
W. H. BEVANS.
SEMI-AUTOMATIC BREECH LOADING ORDNANCE.
(Application filed Dec. 28, 1900.)
(No Model.) 5 Sheets—Sheet 3.

Witnesses
J. P. Britt
L. H. Windsor

Inventor
W. H. Bevans,
by Jamual W. Bevans
his Attorney

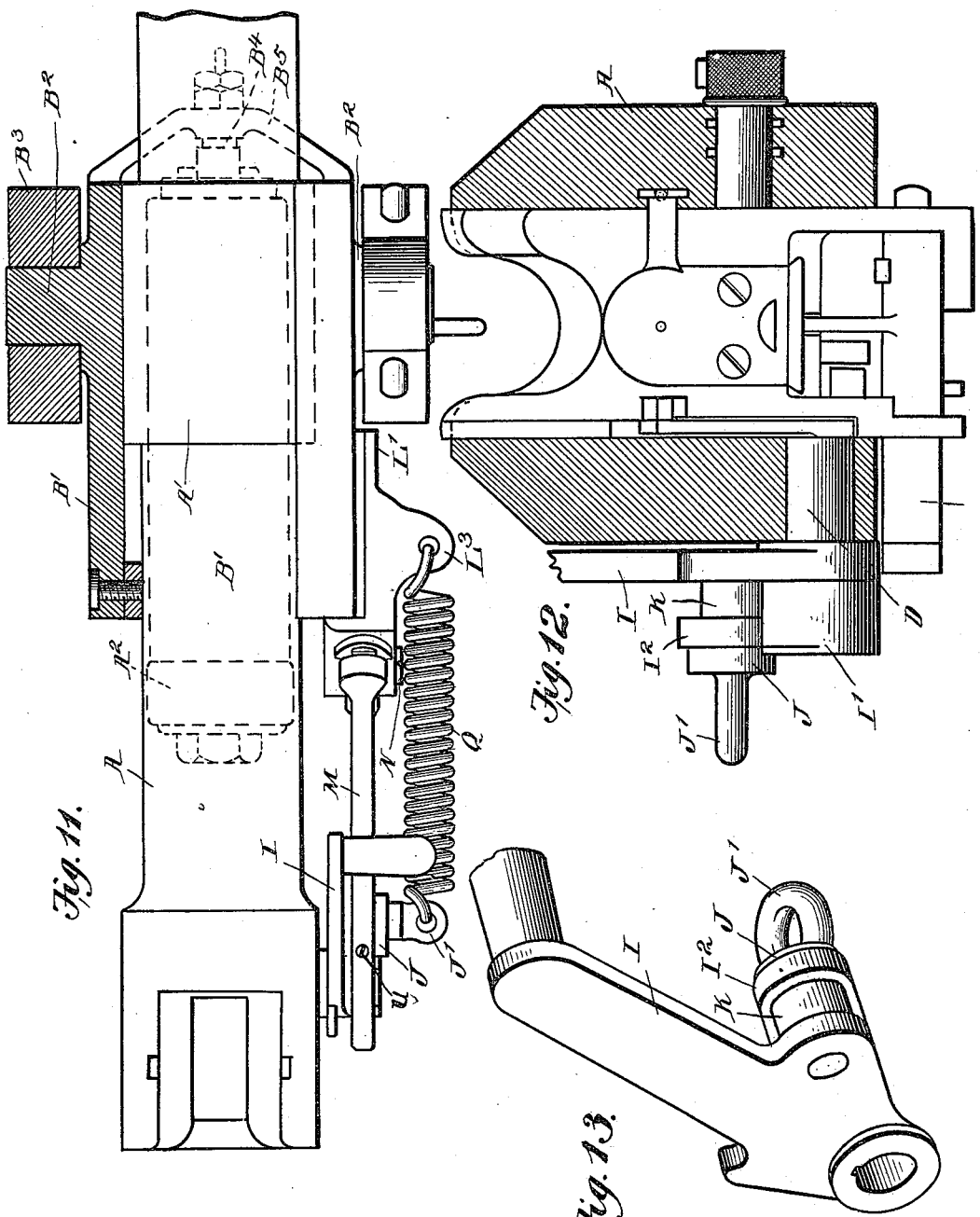

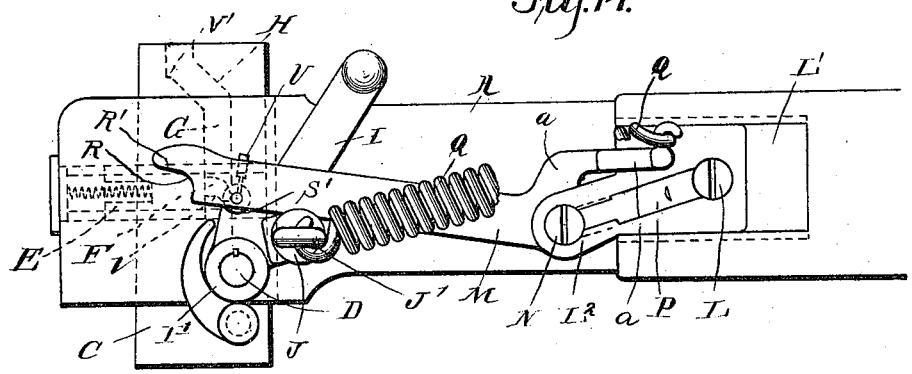
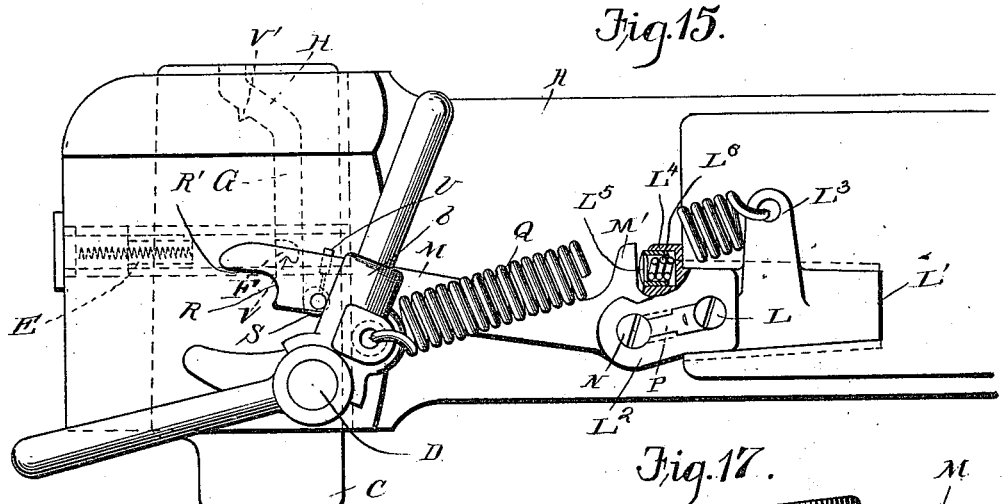
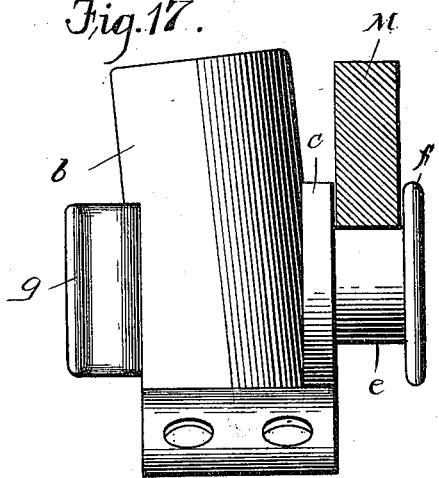

UNITED STATES PATENT OFFICE.

WILLIAM H. BEVANS, OF WASHINGTON, DISTRICT OF COLUMBIA, ASSIGNOR TO THE AMERICAN ORDNANCE COMPANY, OF BRIDGEPORT, CONNECTICUT.

SEMI-AUTOMATIC BREECH-LOADING ORDNANCE.

SPECIFICATION forming part of Letters Patent No. 673,594, dated May 7, 1901.

Application filed December 28, 1900. Serial No. 41,313. (No model.)

*To all whom it may concern:*

Be it known that I, WILLIAM H. BEVANS, a citizen of the United States, residing at Washington, in the District of Columbia, have invented certain new and useful Improvements in Semi-Automatic Breech-Loading Ordnance; and I do hereby declare the following to be a full, clear, and exact description of the invention, such as will enable others skilled in the art to which it appertains to make and use the same.

This invention relates to improvements in semi-automatic guns; and the object is to provide simple and improved means for automatically moving the breech-block into and out of closed position, ejecting the empty cartridge-case, and cocking the hammer, and to so construct said means that it may be readily applied with slight modifications to various forms of rapid-fire guns mounted upon recoil-mounts either by making the same a part of the gun mechanism when the gun is first constructed or by applying it thereto after the gun has been manufactured and is in use.

With the above object in view the invention consists in the novel features of construction hereinafter fully described, particularly pointed out in the claims, and clearly illustrated by the accompanying drawings, in which—

Figure 8:
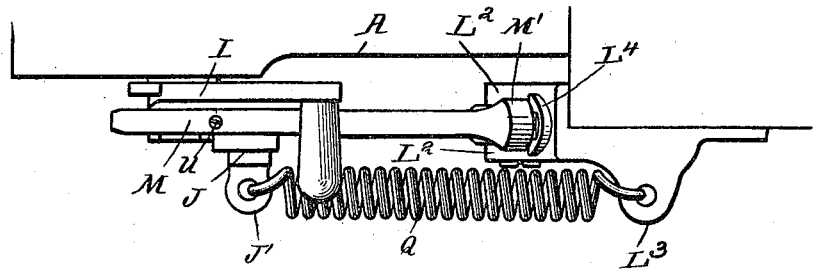
Figure 9:
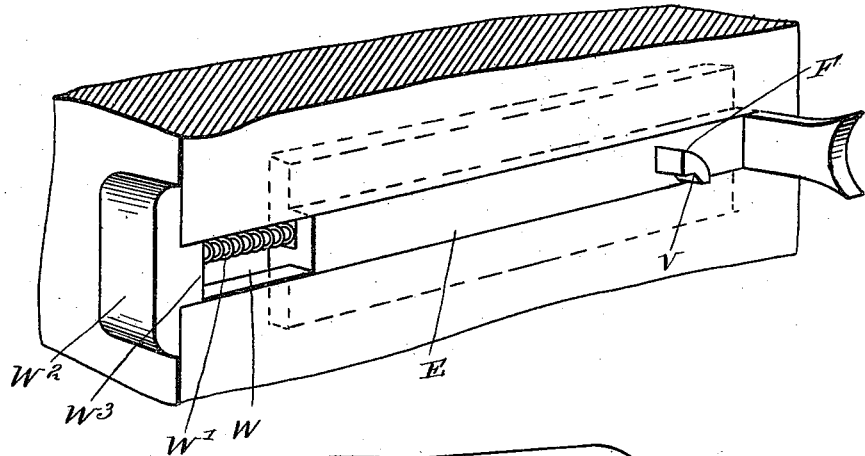
Figure 10:
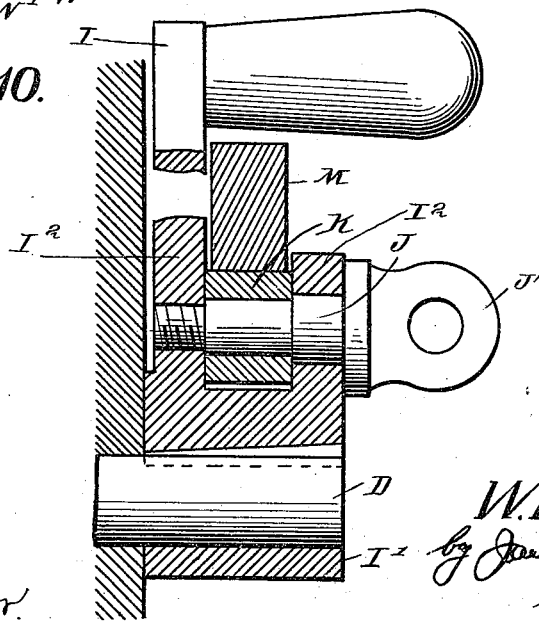

Figure 1 represents a side elevation of a portion of a rapid-fire gun and recoil-mount provided with my invention, the gun being in firing position; Fig. 2, a similar view showing the positions of the various parts when the gun has moved forwardly a sufficient distance on counter-recoil to cause the engagement of the mount-arm with the roller of the operating-lever; Fig. 3, also a similar view showing the positions of the parts when the gun has about reached the limit of its counter-recoil; Figs. 4 and 5, detail views illustrating the eccentric adjustment for the arm carried by the mount, the former being a horizontal section through the pivotal end of the arm and attaching-plate and the latter a side elevation partly in section; Fig. 6, a transverse section through the engaging end of the arm, showing the adjustable means for regulating the tripping of said arm; Fig. 7, a sectional view through the wall of the breech-housing, illustrating a construction for preventing jumping and jarring of the extractor; Fig. 8, a top plan view of the invention as illustrated by Fig. 1; Fig. 9, a perspective view showing the extractor and said means for preventing jarring thereof; Fig. 10, an enlarged sectional view through the operating-lever; Fig. 11, a top plan view, partly in section, of a gun and mount having the invention applied thereto; Fig. 12, a vertical sectional view through the gun-breech; Fig. 13, a perspective view of the lever detached; Fig. 14, a side elevation of a portion of a gun and mount, showing a modification; Fig. 15, a similar view illustrating another modification; Fig. 16, a perspective view of the collar used in the construction illustrated by Fig. 12; and Fig. 17, an edge view of the collar with the mount-arm in position, the latter being shown in section.

The gun illustrated in this application is mounted upon a recoil-mount of common construction and is provided with the form of breech mechanism known as the "Hotchkiss" mechanism, well known in the art, and with the mount forming no part of my invention, which with slight modification may be used with almost any of the rapid-fire guns now in general use.

Referring now more particularly to the accompanying drawings, A designates the gun-body, mounted in the sleeve A', to which the recoil-cylinder $A^2$ is rigidly secured. The sleeve A' slides in the cradle B', which is supported by trunnions $B^2$ on the pivot-saddle $B^3$ of the mount. The piston-rod $B^4$ of the recoil-cylinder is rigidly secured to the yoke $B^5$ at the forward end of the cradle.

C is the breech-block, movable transversely of the longitudinal axis of the gun by the rock-shaft D, which projects through the wall of the gun-breech, and E the sliding extractor, moving in a T-groove formed in the wall of the breech and having an inwardly-extending lug F projecting into the extractor-slot G of the block, which slot is straight for the greater portion of its length and at its upper end is formed with an inclined or cam portion H.

Upon the projecting end of rock-shaft D an operating-lever I is secured, having a hub I', and formed at said hub with two spaced arms or lugs I², which near their outer ends are provided with bearings in transverse alinement to receive a pin J, having an eye J' at its outer end. Mounted upon this pin between the arms I² is a roller K.

Secured to a non-recoiling part of the mount by a screw L is an attaching-plate L', which projects beyond the end of the mount, where it is bifurcated to form two spaced arms L², which are provided with bearings in transverse alinement.

M designates an arm having one end extending between the arms L², to which it is pivoted by a pivotal pin N passing therethrough and through the transverse bearings of said arms. This pin has an eccentric portion N', which is positioned in the pivotal perforation of the arm M and has a slot formed in its outer end, by means of which it may be rotated for the purpose of adjusting the arm M, as will be fully set forth hereinafter. Said pin is provided about its periphery, near its outer end, with teeth N². A groove is formed in the plate L', cutting at one end the perforation for the screw L and at its opposite end the pivotal-pin bearing of the outer one of the arms L² and having its edges undercut near said pivotal pin to form a slideway and retaining-walls for a locking-plate P. This plate P has teeth P' formed on one end, which interlock with the teeth N² of the pivotal pin, so as to lock the latter in its adjustment. Said plate is formed adjacent to the teeth P' with a projection P², which engages in an annular groove P³, formed in the pivotal pin for the purpose of locking said pin from longitudinal movement. The opposite end of the locking-plate is reduced and formed concave to extend beneath the head of the screw L and engage the shank thereof, whereby said locking-plate is held from longitudinal movement. It is only necessary to adjust the arm M once, and that when the mechanism is first assembled, and hence the screw for securing the attaching-plate to the mount is utilized for holding the locking-plate in position, locking the pivotal pin in its adjustment. The attaching-plate is also formed with a lug, having an eye L³ formed therein to receive one end of a coiled spring Q, the opposite end of which is hooked in the eye J' of the pin J, carried by the lever I.

Projecting from the upper edge of plate L is a hollow boss L⁴, in which a pressure member L⁵ is positioned and normally pressed outwardly by a coiled spring L⁶. This member L⁵ bears against a lug M', projecting from the arm M near its pivotal point, and serves to normally press the free end of said arm downwardly. Arm M at its free end is cut out on its lower edge to form an engaging portion or shoulder R, which is concaved, as illustrated, and a stop R'. Said arm in rear of the engaging shoulder is formed in its lower edge with a vertical recess S, in which a roller S' is mounted and projects below the lower edge of the arm. Said roller is mounted upon the eccentric portion T of a pivotal pin T', positioned in bearings formed in the arm M and provided with a head having a slot, by means of which it may be rotated to adjust the roller with relation to the arm. Said head is formed adjacent to its outer end with an annular groove T², into which the lower end of a locking-screw U extends, which is carried by the arm M and disposed vertically therein.

The arm M rests at its lower end normally on roller K of the operating-lever I, being pressed thereon by the pressure member L⁵ of the plate L', and is prevented from lateral displacement by the outer ends of arms I², which project beyond the roller and serve as retaining-flanges. When the gun is fired, it moves rearwardly, carrying with it the lever I, which slides along the arm M. When the gun has reached the limit of recoil, it has moved far enough rearwardly to permit the engaging portion of the arm M to be moved downwardly under the influence of the pressure member, with the shoulder R in front of the roller K, the downward movement of the rear end of the arm being limited by the engagement of the stop R' with the upper surface of the roller. As the gun moves forward on its counter-recoil the roller engages the shoulder R, and the lever I is moved relatively to the gun, it swinging before the engaging end of the arm M, and rocks the shaft D, which moves the breech-block downwardly to unmask the bore of the gun. The downward movement of the block effects the rearward movement of the extractor through the coaction of the extractor slot and lug. When the gun has about reached the limit of its counter-recoil, as illustrated in Fig. 3, the block is at the limit of its downward movement, and the extractor-lug, which is formed with a notch V in its under side, is just above a notch V', formed in the lower wall of the cam portion of the extractor-slot. The arm M in the meantime has been gradually prying or disengaging its end from the roller K of the operating-lever by the contact of the roller S' with the hub I' of the lever. Upon disengagement of the arm M from lever I the block is moved upwardly slightly by the action of the coiled spring Q until the notch V' of the block engages the notch of the extractor-lug, when the block is held from further movement until the extractor is moved forwardly by the insertion of a fresh cartridge, which causes the lug to be disengaged from the block and the latter to be moved to close the breech by the action of said coiled spring.

The disengagement of the arm M from the lever I after it has performed its function—namely, the rocking of the shaft D to move the block downward to open the breech—is greatly facilitated by providing the engaging shoulder of said lever with a rolling surface—that is, the roller S'. When the parts are in the relative positions shown in Fig. 3, said roller by a rotary movement upon its pivot instantly causes the disengagement of the arm M therefrom, so that the disengagement occurs sooner than it would were a fixed shoulder or stud provided instead of the roller. With a rigid stud or shoulder it would be necessary to use much more of the counter-recoil of the gun to effect this disengagement of the arm and lever, so that by providing a rolling surface a decided advantage is gained.

It has been found that the sudden movement of the block causes a jarring or jumping of the extractor, so that occasionally the lug F is not in position to have its notch engaged by the notch of the block, thus permitting the block to move upwardly and close the breech before a cartridge can be positioned in the gun. To obviate this, I have provided the following construction, which positively prevents said jarring or jumping of the extractor and always insures the lug thereof being in proper position to engage with and lock the block in its downward position.

The extractor is formed with a longitudinally-extending groove or recess W, opening through the rear wall thereof, and in this recess a coiled spring W' is positioned, the same being secured at its forward end to the extractor and at its rear end to a block $W^2$, positioned upon the rear of the gun and having a portion $W^3$ fitting in the T-groove of the gun-breech. This spring serves to constantly draw the extractor rearwardly and to prevent jarring and jumping thereof when the block moves downwardly to unmask the bore.

The adjustment for the arm M is provided so that said arm may be adjusted longitudinally in order to compensate for differences in distance between the pivot centers of the roller K and arm M when the mechanism is applied to different guns, and, as before stated, this adjustment is only necessary at the time of the application of the invention to the gun.

The point of tripping of the arm M may be regulated by adjusting the roller S'; but while this roller is desirable it is not essential.

In the modification illustrated by Fig. 14 instead of providing the pressure member $L^5$ the arm M is formed with a rearwardly and upwardly curved portion $a$ beyond its pivot, which extension $a$ is provided with a hooked end to receive one end of the spring Q. The spring thus serves to press the rear end of the arm downwardly as well as to move the block to close the breech.

In applying the invention to some forms of guns already in use the construction may be cheapened by securing a collar $b$ (illustrated in Figs. 12, 13, and 14) upon the hand-lever of the gun instead of substituting an entirely new lever, such as has been described herein. Said collar is formed on its inner side with a boss $c$, the outer face of which is parallel with the wall of the gun-breech, and projecting centrally from the boss and at right angles thereto is a stud $d$, upon which a roller $e$ is mounted. The arm M rests normally upon this roller and is prevented from lateral displacement by the boss and a flange $f$, formed on the outer edge of the roller. Projecting from the outer side of the collar is a lug $g$, formed with an eye to receive one end of the spring Q.

I do not limit my invention to guns having a drop-block and a rock-shaft, as it may be used with guns having other forms of breech-blocks—as, for instance, swinging blocks—and the term "rock-shaft" used should be understood to comprehend the pivotal or main bolt of such a block.

Having thus fully described my invention, what I claim as new, and desire to secure by Letters Patent of the United States, is—

1. In a breech-loading gun, the combination with the breech-block and means for moving the block into and out of closed position, of an extractor actuated by said block, a detent carried by the extractor for engaging and holding said block in its open position, and means for holding said detent in position to engage the block when the extractor has moved to proper position, substantially as described.

2. In a breech-loading gun, the combination with the breech-block, and means for moving the same into and out of closed position, of an extractor actuated by the block, a detent carried by the extractor for engaging and holding the breech-block in its open position, and elastic means acting on said extractor in a rearward direction for the purpose set forth.

3. In a breech-loading gun, the combination with the breech-block, and means for moving the same into and out of closed position, of an extractor actuated by the block, a detent carried by the extractor for engaging and holding the block in its open position, and a spring connected with the extractor and exerting a rearward pull thereon, substantially as described.

4. In a breech-loading gun, the combination with a sliding block, having a cam-slot formed therein and provided with a notch, and means for moving said block into and out of its closed position, of a longitudinally-movable extractor having a lug projecting into said slot and notched to coact with the notch of the block to hold the latter in its open position, and elastic means for holding said lug with its notch in position to be engaged by the notch of the block when the extractor is moved rearwardly, substantially as described.

5. The combination with a breech-loading gun, a recoil-mount, a breech-block, and a shaft for actuating the block, of an arm carried by the mount and engaging with said shaft on counter-recoil of the gun, and means for effecting the longitudinal adjustment of said arm, substantially as described.

6. The combination with a breech-loading gun, a recoil-mount, a breech-block, and a shaft for actuating the block, of an arm pivoted to a non-recoiling part of the mount and engaging with said shaft on counter-recoil of the gun, a pivotal pin for said arm having an eccentric portion for effecting the longitudinal adjustment of the arm, and locking means for said pin, substantially as described.

7. The combination with a breech-loading gun, a recoil-mount, a breech-block, and a shaft for actuating the block, of an arm pivoted to a non-recoiling part of the mount and engaging with the shaft on counter-recoil of the gun, a pivotal pin for said arm having an eccentric portion for adjusting said arm longitudinally, and formed about its periphery with teeth, and a locking member having teeth coacting with the teeth of the pin to lock it in its adjustment, substantially as described.

8. The combination with a breech-loading gun, a recoil-mount, a breech-block, and a shaft for actuating the block, of an arm pivoted to a non-recoiling part of the mount and engaging with said shaft on counter-recoil of the gun, a pivotal pin for said arm having an eccentric portion for effecting the longitudinal adjustment of the arm, and formed with an annular groove and a plurality of teeth about its periphery, a sliding locking-plate having a projection engaging in said groove and teeth meshing with the teeth of the pin, and means for locking said plate from movement, substantially as described.

9. The combination with a breech-loading gun, a recoil-mount, a breech-block, and a shaft for actuating the block, of an arm pivoted to a non-recoiling part of the mount and engaging with said shaft on counter-recoil of the gun, a pivotal pin for said arm having an eccentric portion for effecting the longitudinal adjustment of the arm and formed with a plurality of teeth about its periphery, a sliding plate having teeth formed on one end coacting with the teeth of the pin to lock the latter, and a screw carried by the mount and engaging the opposite end of the plate, substantially as described.

10. The combination with a breech-loading gun, a recoil-mount, a breech-block, and a rock-shaft for actuating the block, of an arm carried by a non-recoiling part of the mount and engaging with said shaft on counter-recoil of the gun and automatically disengaging said shaft at or near the limit of counter-recoil, and means for regulating the point of said disengagement, substantially as described.

11. The combination with a breech-loading gun, a recoil-mount, a breech-block, and a rock-shaft for actuating the block, of an arm carried by a non-recoiling part of the mount and engaging with said shaft on counter-recoil of the gun and automatically disengaging the same, at or near the limit of counter-recoil, and an adjustable tripping portion carried by said arm, substantially as described.

12. The combination with a breech-loading gun, a recoil-mount, a breech-block, and a rock-shaft for actuating the block into and out of closed position, of an arm carried by a non-recoiling part of the mount and engaging the said shaft on counter-recoil of the gun, and automatically disengaging the same at or near the limit of counter-recoil, a tripping-roller carried by said arm, a pivotal pin for said roller having an eccentric portion for adjusting said roller, and means for locking said pin, substantially as described.

13. The combination with a breech-loading gun, a recoil-mount, a breech-block, and a rock-shaft for actuating said block, of an arm carried by a non-recoiling part of the mount and engaging said shaft on counter-recoil of the gun, and disengaging the same at or near the limit of counter-recoil, a tripping-roller carried by said arm, a pivotal pin for said roller having an eccentric portion upon which the roller is mounted and formed with an annular groove, and a locking-screw carried by the arm and engaging in said annular groove for locking the pin, substantially as described.

14. The combination with a breech-loading gun, a recoil-mount, a breech-block, and a rock-shaft for actuating the block, of a lever on said shaft, a roller carried by said lever, and an arm pivoted to a non-recoiling part of the mount and resting on said roller during recoil of the gun and formed with a shoulder engaged by said roller on counter-recoil of the gun, substantially as described.

15. The combination with a breech-loading gun, a recoil-mount, a breech-block, and a rock-shaft for actuating the block, of a lever on said shaft, a laterally-disposed roller carried by said lever, retaining-flanges at the ends of said roller, and an arm pivoted to a non-recoiling part of the mount and resting on said roller between said flanges during recoil of the gun, and formed with a shoulder engaged by said roller on counter-recoil of the gun, substantially as described.

16. The combination with a breech-loading gun, a recoil-mount, a breech-block, and a rock-shaft for actuating the block, of a lever on said shaft, a laterally-disposed roller carried by said lever, and an arm pivoted to a non-recoiling part of the mount and resting on said roller as the gun recoils and formed near its free end with a concaved shoulder engaged by the roller on counter-recoil of the gun, substantially as described.

17. The combination with a breech-loading gun, a recoil-mount, a breech-block, and a rock-shaft for actuating the block, of a lever on said shaft, a laterally-disposed projection carried by said lever, an arm pivoted to a non-recoiling part of the mount and resting on said projection during recoil of the gun, and formed at its free end with a shoulder engaged by the projection on counter-recoil of the gun, and with a stop portion extending rearwardly from the shoulder to engage the projection and limit the downward movement of the free end of the arm, substantially as described.

18. The combination with a breech-loading gun, a recoil-mount, a breech-block, and a rock-shaft for actuating the block, of a lever on said shaft, a laterally-disposed projection carried by said lever, an arm pivoted to a non-recoiling part of the mount and resting on said projection during recoil of the gun, and cut out on its lower edge at its free end to form a shoulder engaged by said projection on counter-recoil of the gun, and a stop to limit the downward movement of the free end of the arm, substantially as described.

19. The combination with a breech-loading gun, a recoil-mount, a breech-block, and a rock-shaft for actuating the block, of a lever on said shaft, a laterally-disposed roller carried by said lever, an arm pivoted to a non-recoiling part of the mount, and resting on said roller during recoil of the gun and formed with a shoulder engaged by said roller on counter-recoil of the gun, and a spring connected with said lever for returning the block to its closed position, substantially as described.

20. The combination with a breech-loading gun, a recoil-mount, a breech-block, and a rock-shaft for actuating said block, of a lever on said shaft, a laterally-disposed projection carried by said lever, an arm pivoted intermediately of its ends to a non-recoiling part of the mount and resting on said projection during recoil of the gun and formed near one end with a shoulder engaged by said projection on counter-recoil of the gun, and a spring connected with the lever and opposite end of the arm, substantially as described.

21. The combination with a breech-loading gun, a recoil-mount, a breech-block, and a rock-shaft for actuating the block, of a lever on said shaft and formed with a tripping-shoulder and a laterally-disposed projection, an arm pivoted to a non-recoiling part of the mount and resting on said projection during recoil of the gun and formed with a shoulder engaged by said projection on counter-recoil of the gun, and an adjustable tripping portion carried by the arm and coacting with the tripping-shoulder to disengage the shoulder of the arm from the projection of the lever, substantially as described.

22. The combination with a breech-loading gun, a recoil-mount, a breech-block, and a rock-shaft for actuating the block, of a lever on said shaft and formed with a tripping-shoulder and a laterally-disposed projection, an arm pivoted to a non-recoiling part of the mount and resting on said projection during recoil of the gun and formed with a shoulder engaged by said projection on counter-recoil of the gun, and an adjustable tripping-roller carried by the arm and coacting with the tripping-shoulder to disengage the shoulder of the arm from the projection of the lever, substantially as described.

23. The combination with a breech-loading gun, a recoil-mount, a breech-block, a rock-shaft for actuating the block, and a lever on said shaft, of a collar positioned upon said lever and having a shoulder, and an arm pivoted at one end to a non-recoiling part of the mount and formed with a shoulder engaged by said shoulder of the collar on counter-recoil of the gun, substantially as described.

24. The combination with a breech-loading gun, a recoil-mount, a breech-block, a rock-shaft for actuating said block, and a lever on said shaft, of a collar on said lever, a roller carried by said collar, and an arm pivoted to the mount and formed with a shoulder engaged by said roller on counter-recoil of the gun, substantially as described.

In testimony whereof I affix my signature in presence of two witnesses.

WILLIAM H. BEVANS.

Witnesses:
A. Y. LEECH, Jr.,
MATHILDE AMMEN.